Figure 1:
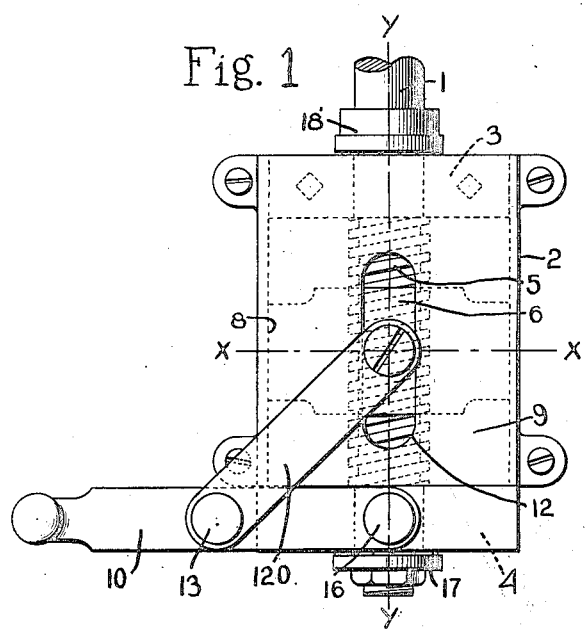

C. H. RICHARDSON.
STEERING GEAR.
APPLICATION FILED JULY 17, 1914.

1,151,717.

Patented Aug. 31, 1915.

Witnesses.
J. Morrill Fuller
William E. Gagen

Inventor.
Charles H. Richardson
by Heard Smith & Tennant.
Atty's

UNITED STATES PATENT OFFICE.

CHARLES H. RICHARDSON, OF GLOUCESTER, MASSACHUSETTS, ASSIGNOR OF ONE-HALF TO HOSEA C. TUFTS, OF GLOUCESTER, MASSACHUSETTS.

STEERING-GEAR.

1,151,717.   Specification of Letters Patent.   Patented Aug. 31, 1915.

Application filed July 17, 1914.   Serial No. 851,507.

*To all whom it may concern:*

Be it known that I, CHARLES H. RICHARDSON, a citizen of the United States, residing at Gloucester, county of Essex, State of Massachusetts, have invented an Improvement in Steering-Gear, of which the following description, in connection with the accompanying drawing, is a specification, like characters on the drawing representing like parts.

This invention relates to steering gears adapted for use in automobiles, motor boats, and similar vehicles, and has for its object to provide a steering gear which is simple in construction and can be inexpensively manufactured, which is sure in its operation and which is of such a construction that any pressure applied to the front wheels of the automobile will not be transmitted to the steering wheel, thus obviating any danger that the steering wheel will be wrenched from the hand of the operator by the wheels of the automobile passing over or running against an obstruction.

In order to give a comprehensive understanding of my invention, I have illustrated in the drawings some selected embodiments thereof which will now be described, after which the novel features will be pointed out in the appended claim.

Figure 3:
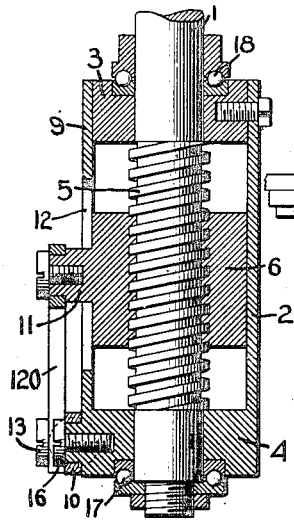
Figure 2:
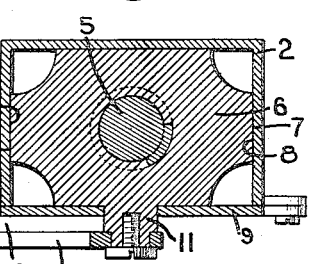
Figure 5:
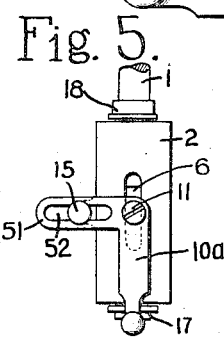
Figure 4:
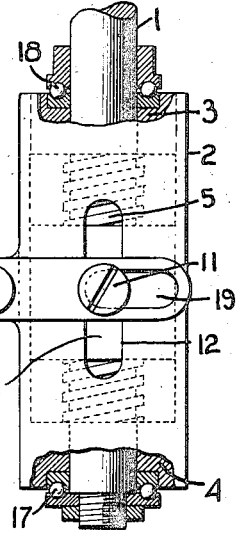

Referring to the drawings, Figure 1 is a side view of a steering device embodying my invention; Fig. 2 is a section on the line x—x, Fig. 1; Fig. 3 is a section on the line y—y, Fig. 2; Fig. 4 illustrates a modified form of the invention; Fig. 5 illustrates a modified form of the invention.

1 designates the steering shaft or post, to the upper end of which is attached the usual steering wheel. The lower end of the steering shaft 1 extends into and is journaled in a frame 2 which can conveniently be in the form of a box, said frame being provided with bearings 3 and 4 in which the shaft is journaled. The portion 5 of the shaft 1 within the box 2 is screw-threaded, as illustrated, and this portion coöperates with a nut or cross-head 6 which is interiorly screw-threaded and which extends transversely across the frame 2. The ends 7 of said nut engage the opposite sides 8 of the box or frame 2, said sides 8 constituting guides for the nut and coöperating with the ends 7 thereof to hold the nut in its proper position as it is moved by the screw-threaded portion 5. The box or frame 2 is herein shown as provided with a removable cover 9 so that by removing said cover access can be had to the nut and the screw 5.

10 designates a steering arm which is pivoted to the box or frame 2 and which is connected to the nut 6 so that as the nut is moved by the screw the arm 10 will be swung about its pivot. It will be understood, of course, that suitable connections lead from this arm 10 to the steering rod of the automobile, or to the rudder of the boat, so that as the arm 10 is operated motion will be transmitted to the wheels or rudder as the case may be.

The connection between the nut 6 and the arm 10 may be provided for in various ways. In Figs. 1, 2 and 3 the nut 6 is provided with a stud 11 which extends through and operates in a slot 12 in the cover 9 and to which is pivoted a link 120 that is also pivoted to a stud 13 extending from the steering arm 10, which is pivoted on a stud 16 extending from the frame. If desired I may provide two links 120, one on each side of the frame 2. In Fig. 4 the steering arm 10 is pivoted on a stud 15 situated centrally of the frame 2 and is provided at its end with a slot 19 in which the stud 11 extending from the nut 6 operates.

In order to take up the thrust between the steering shaft 1 and the box or frame 2 I propose to provide ball thrust bearings 17 and 18 situated at either end of the box or frame. It will be noted that in both embodiments of my invention the steering arm 10 is pivoted on a stud extending from one side of the frame and is connected to the nut which is operated within and is guided by the frame so that any advance of the nut 6 due to rotation of the steering shaft will give movement to the steering arm 10.

My device is further very simple in its construction and can be easily and cheaply manufactured and it has a further advantage that it acts as a lock to hold the wheels of the vehicle in their correct position and prevents any movement of the wheels except that which is transmitted by the steering shaft 1.

While I have illustrated some embodiments of my invention I do not wish to be limited to the constructional features shown.

In Fig. 5 I have illustrated another embodiment of my invention wherein the steering arm 10ª is L-shaped and is pivotally connected at its apex to the stud 11 extending from the nut 6, the member 51 of said steering arm being provided with a slot 52 in which is received the stud 15 that is rigid with the casing 2.

I claim:

In a steering gear, the combination with a hollow box or frame rectangular in interior cross section and having opposed flat parallel sides and heads at its ends, of a steering shaft journaled in said heads and provided with a screw-threaded portion within the frame, a nut mounted on said screw-threaded portion and having flat faces to engage slidably the inner walls of said box, one of said walls having a slot, a stud extending from said nut through said slot, a steering arm pivoted to the frame, and a connection between said stud and steering arm, said connection and said arm operating in the same vertical plane perpendicular to the axis of the stud.

In testimony whereof, I have signed my name to this specification, in the presence of two subscribing witnesses.

CHARLES H. RICHARDSON.

Witnesses:
WILLIAM E. KERR,
L. BELLE FARR.